United States Patent
Yang et al.

(10) Patent No.: US 9,215,381 B2
(45) Date of Patent: Dec. 15, 2015

(54) IMAGE BLURRING METHOD AND APPARATUS, AND ELECTRONIC DEVICES

(71) Applicant: Huawei Technologies Co., Ltd., Shenzhen (CN)

(72) Inventors: Xiaowei Yang, Hangzhou (CN); Zuquan Zheng, Hangzhou (CN); Jinsheng Xiao, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/611,775

(22) Filed: Feb. 2, 2015

(65) Prior Publication Data
US 2015/0264271 A1 Sep. 17, 2015

(30) Foreign Application Priority Data
Mar. 14, 2014 (CN) .......................... 2014 1 0095114

(51) Int. Cl.
G06K 9/00 (2006.01)
H04N 5/262 (2006.01)
G06T 5/00 (2006.01)
G06T 7/00 (2006.01)

(52) U.S. Cl.
CPC ............... *H04N 5/262* (2013.01); *G06T 5/002* (2013.01); *G06T 7/004* (2013.01); *G06T 7/0069* (2013.01); *G06T 2207/10016* (2013.01); *G06T 2207/20144* (2013.01)

(58) Field of Classification Search
CPC ............ G06K 9/0061; H04N 5/23232; H04N 5/2356; G06T 2207/30168
USPC ..................................................... 382/103
See application file for complete search history.

(56) References Cited

U.S. PATENT DOCUMENTS 7,657,171 B2 * 2/2010 Sundstrom ............. G03B 13/30
 348/208.12
8,355,039 B2 * 1/2013 Michrowski et al. ...... 348/14.01
(Continued)

FOREIGN PATENT DOCUMENTS

CN 103152521 A 6/2013

OTHER PUBLICATIONS

Kosloff, T., et al, "An Algorithm for Rendering Generalized Depth of Field Effects Based on Simulated Heat Diffusion," Computational Science and It's Applications, Aug. 26, 2007, pp. 1124-1140.
(Continued)

*Primary Examiner* — Stephen R Koziol
*Assistant Examiner* — Shaghayegh Azima
(74) *Attorney, Agent, or Firm* — Conley Rose, P.C.; Grant Rodolph

(57) ABSTRACT

An image blurring method and apparatus, and an electronic device, and pertains to the field of image processing. The method includes acquiring a first image and a second image that are captured by a same camera and have a same viewfinder coverage; acquiring depth information according to the first image and the second image; determining a background area of the first image according to the depth information; and performing blurring processing on content in the background area of the first image. In the present invention, solving a problem in the prior art that a user needs to open an image using software and manually selects a background area, and achieving an effect of improving a blurring effect and simplifying a user operation.

9 Claims, 4 Drawing Sheets

(56) References Cited

U.S. PATENT DOCUMENTS

| | | |
|---|---|---|
| 8,363,085 B2 | 1/2013 | Michrowski et al. |
| 2009/0290041 A1 | 11/2009 | Tamaru |
| 2012/0007940 A1* | 1/2012 | Michrowski et al. ...... 348/14.07 |
| 2012/0007942 A1* | 1/2012 | Michrowski ............ H04N 7/147 348/14.08 |
| 2012/0250159 A1* | 10/2012 | Abramovich ........ G02B 27/123 359/618 |
| 2013/0063566 A1* | 3/2013 | Morgan-Mar ........ G06T 7/0069 348/46 |
| 2014/0152886 A1* | 6/2014 | Morgan-Mar ..... H04N 5/23212 348/349 |
| 2014/0153783 A1* | 6/2014 | Tao ....................... G06T 7/0075 382/106 |
| 2014/0198976 A1* | 7/2014 | Coffman ............... G06T 7/0075 382/154 |
| 2015/0243035 A1* | 8/2015 | Narasimha ............ G06T 7/0046 382/154 |

OTHER PUBLICATIONS

Jeong, K., et al., "Digital shallow depth-of-field adapter for photographs," Visual Computer, vol. 24, No. 4, Dec. 21, 2007, pp. 281-294.

Adams, J., et al., "A Fully Automatic Digital Camera Image Refocusing Algorithm," IVMSP, Jun. 16, 2011, pp. 81-86.

Foreign Communication From a Counterpart Application, European Application No. 15151927.9, Extended European Search Report dated Aug. 10, 2015, 9 pages.

Partial English Translation and Abstract of Chinese Patent Application No. CN103152521A, Apr. 10, 2015, 3 pages.

* cited by examiner

IMAGE BLURRING METHOD AND APPARATUS, AND ELECTRONIC DEVICES

CROSS-REFERENCE TO RELATED APPLICATIONS

This application claims priority to Chinese Patent Application No. 201410095114.9, filed with the Chinese Patent Office on Mar. 14, 2014, which is incorporated herein by reference in its entirety.

TECHNICAL FIELD

The present invention relates to the field of image processing, and in particular, to an image blurring method and apparatus, and an electronic device.

BACKGROUND

As a common photography means, background blurring can quickly make a subject stand out, and therefore is well known and used by a majority of amateur photographers. However, to capture a photograph with a background blurring effect, a professional single-lens reflex camera has to be used, and a desired effect can be achieved only after a complex adjustment operation.

In order to meet a requirement of a non-professional photographer, there is an existing method for obtaining a background blurring effect by processing an image by means of software. After capturing an image, a user opens the image using image processing software and manually selects a background area using a tool that comes with the image processing software. The image processing software performs Gaussian Blur on a same or gradient scale on the background area selected by the user, and outputs an image with a background blurring effect.

In a process of implementing the present invention, the inventor finds that at least the following disadvantage exists in the prior art.

In an existing image processing method, first, a user needs to open an image using software and manually select a background area; in addition, the manually selected background area is inaccurate, and an operation process is complex, thereby causing a poor blurring effect and a waste of much user's time.

SUMMARY

To solve a problem in the prior art that box selection of a background area is inaccurate and an operation process is complex because a user needs to open an image using software and manually select the background area, embodiments of the present invention provide an image blurring method and apparatus, and an electronic device. The technical solutions are as follows.

According to a first aspect, an image blurring method is provided, where the method includes acquiring a first image and a second image that are captured by a same camera and have a same viewfinder coverage, where an image distance of the first image is less than an image distance of the second image; acquiring depth information according to the first image and the second image, where the depth information is used to represent a distance between a scene at each pixel in the first image and a capturing point and a distance between a scene at each pixel in the second image and the capturing point; determining a background area of the first image according to the depth information; and performing blurring processing on content in the background area of the first image.

In a first possible implementation manner of the first aspect, the acquiring depth information according to the first image and the second image includes acquiring photographic parameters of the camera, where the photographic parameters include a calibrated focal length, a lens diameter, and a relationship parameter, where the relationship parameter is used to represent a relationship between an aperture size of the camera and blurriness of a defocused image; determining initialized depth information according to the photographic parameters and the respective image distances of the first image and the second image; performing N iterative computations on the initialized depth information according to the photographic parameters, the first image, and the second image, where N is a positive integer and $N \geq 2$; and acquiring a result obtained by the $N^{th}$ iterative computation and using the result as the depth information.

With reference to the first possible implementation manner of the first aspect, in a second possible implementation manner of the first aspect, the performing N iterative computations on the initialized depth information according to the photographic parameters, the first image, and the second image includes, when a first computation is performed, determining a diffusion coefficient of the first computation and a diffusion area of the first computation according to the initialized depth information and the photographic parameters; according to the first image, the second image, the diffusion coefficient of the first computation, and the diffusion area of the first computation, determining forward heat diffusion equations that are respectively corresponding to the first image and the second image in the first computation; determining a minimum value equation in the first computation, where the minimum value equation is used to represent a minimum value of the sum of a first difference and a second difference, where the first difference is a difference between an actual output value and a theoretical output value of a forward heat diffusion equation corresponding to the first image, and the second difference is a difference between an actual output value and a theoretical output value of a forward heat diffusion equation corresponding to the second image; according to the minimum value equation in the first computation, obtaining a minimum gradient of each pixel in the first image and the second image in the first computation; according to a preset correction formula, performing n iterative corrections on depth information corresponding to a pixel of which a minimum gradient in the first computation is less than a preset gradient threshold, and obtaining depth information after the first computation, where n is a positive integer and $n \geq 2$; and when a $p^{th}$ computation is performed, determining a diffusion coefficient of the $p^{th}$ computation and a diffusion area of the $p^{th}$ computation according to depth information that is obtained after a $(p-1)^{th}$ computation and the photographic parameters; according to the first image, the second image, the diffusion coefficient of the $p^{th}$ computation, and the diffusion area of the $p^{th}$ computation, determining forward heat diffusion equations that are respectively corresponding to the first image and the second image in the $p^{th}$ computation; determining a minimum value equation in the $p^{th}$ computation; according to the minimum value equation in the $p^{th}$ computation, obtaining a minimum gradient of each pixel in the first image and the second image in the $p^{th}$ computation; according to the preset correction formula, performing n iterative corrections on depth information corresponding to a pixel of which a minimum gradient in the $p^{th}$ computation is less than the preset gradient threshold, and obtaining depth information after the $p^{th}$ computation, where $2 \le p \le N$.

With reference to the second possible implementation manner of the first aspect, in a third possible implementation manner of the first aspect, the correction formula is: $s'(y)=s(y)-(\text{data\_reg}+2\alpha\kappa s(y)-2\alpha\Delta s(y))$; where $s'(y)$ is depth information after a correction, $s(y)$ is depth information before the correction, data_reg is a minimum value gradient, and $\alpha$ and $k$ are preset regularization parameters.

In a fourth possible implementation manner of the first aspect, the determining a background area of the first image according to the depth information includes determining a critical depth between a foreground area and a background area according to photographic parameters and the respective image distances of the first image and the second image; and determining that a pixel area, in the first image, corresponding to the depth information that depth represent by the depth information that is greater than the critical depth is the background area of the first image.

In a fifth possible implementation manner of the first aspect, the performing blurring processing on content in the background area of the first image includes normalizing the depth information to obtain normalized depth information; dividing an interval, in the background area, of the normalized depth information equally into q segments to obtain q background intervals; determining, according to a preset maximum blur radius, blur parameters corresponding to each of the q background intervals, where the blur parameters include a blur radius and a standard deviation; and performing, according to the blur radius and the standard deviation that are corresponding to each of the q background intervals, blurring processing separately on a pixel area, in the first image, corresponding to each of the q background intervals.

According to a second aspect, an image blurring apparatus is provided, where the apparatus includes an image acquiring module configured to acquire a first image and a second image that are captured by a same camera and have a same viewfinder coverage, where an image distance of the first image is less than an image distance of the second image; a depth information acquiring module configured to acquire depth information according to the first image and the second image, where the depth information is used to represent a distance between a scene at each pixel in the first image and a capturing point and a distance between a scene at each pixel in the second image and the capturing point; a background determining module configured to determine a background area of the first image according to the depth information; and a blurring module configured to perform blurring processing on content in the background area of the first image.

In a first possible implementation manner of the second aspect, the depth information acquiring module includes a first acquiring unit configured to acquire photographic parameters of the camera, where the photographic parameters include a calibrated focal length, a lens diameter, and a relationship parameter, where the relationship parameter is used to represent a relationship between an aperture size of the camera and blurriness of a defocused image; an initializing unit configured to determine initialized depth information according to the photographic parameters and the respective image distances of the first image and the second image; a computing unit configured to perform N iterative computations on the initialized depth information according to the photographic parameters, the first image, and the second image, where N is a positive integer and $N \ge 2$; and a second acquiring unit configured to acquire a result obtained by the $N^{th}$ iterative computation and use the result as the depth information.

With reference to the first possible implementation manner of the second aspect, in a second possible implementation manner of the second aspect, the computing unit is configured to, when a first computation is performed, determine a diffusion coefficient of the first computation and a diffusion area of the first computation according to the initialized depth information and the photographic parameters; according to the first image, the second image, the diffusion coefficient of the first computation, and the diffusion area of the first computation, determine forward heat diffusion equations that are respectively corresponding to the first image and the second image in the first computation; determine a minimum value equation in the first computation, where the minimum value equation is used to represent a minimum value of the sum of a first difference and a second difference, where the first difference is a difference between an actual output value and a theoretical output value of a forward heat diffusion equation corresponding to the first image, and the second difference is a difference between an actual output value and a theoretical output value of a forward heat diffusion equation corresponding to the second image; according to the minimum value equation in the first computation, obtain a minimum gradient of each pixel in the first image and the second image in the first computation; according to a preset correction formula, perform n iterative corrections on depth information corresponding to a pixel of which a minimum gradient in the first computation is less than a preset gradient threshold, and obtain depth information after the first computation, where n is a positive integer and $n \ge 2$; and the computing unit is configured to, when a $p^{th}$ computation is performed, determine a diffusion coefficient of the $p^{th}$ computation and a diffusion area of the $p^{th}$ computation according to depth information that is obtained after a $(p-1)^{th}$ computation and the photographic parameters; according to the first image, the second image, the diffusion coefficient of the $p^{th}$ computation, and the diffusion area of the $p^{th}$ computation, determine forward heat diffusion equations that are respectively corresponding to the first image and the second image in the $p^{th}$ computation; determine a minimum value equation in the $p^{th}$ computation; according to the minimum value equation in the $p^{th}$ computation, obtain a minimum gradient of each pixel in the first image and the second image in the $p^{th}$ computation; according to the preset correction formula, perform n iterative corrections on depth information corresponding to a pixel of which a minimum gradient in the $p^{th}$ computation is less than the preset gradient threshold, and obtain depth information after the $p^{th}$ computation, where $2 \le p \le N$.

In a third possible implementation manner of the second aspect, the background determining module includes a critical depth determining unit configured to determine a critical depth between a foreground area and a background area according to photographic parameters and the respective image distances of the first image and the second image; and a background determining unit configured to determine that a pixel area, in the first image, corresponding to the depth information that depth represent by the depth information that is greater than the critical depth is the background area of the first image.

In a fourth possible implementation manner of the second aspect, the blurring module includes a normalizing unit configured to normalize the depth information to obtain normalized depth information; a segmenting unit configured to divide an interval, in the background area, of the normalized depth information equally into q segments to obtain q background intervals; a parameter determining unit configured to determine, according to a preset maximum blur radius, blur parameters corresponding to each of the q background intervals, where the blur parameters include a blur radius and a standard deviation; and a blurring unit configured to perform, according to the blur radius and the standard deviation that are corresponding to each of the q background intervals, blurring processing separately on a pixel area, in the first image, corresponding to each of the q background intervals.

According to a third aspect, an electronic device is provided, where the electronic device includes the image blurring apparatus according to the second aspect or any one of the possible implementation manners of the second aspect.

Beneficial effects brought by the technical solutions provided in the embodiments of the present invention are as follows.

A first image and a second image that are captured by a same camera and have a same viewfinder coverage are acquired; depth information is acquired according to the first image and the second image; a background area of the first image is determined according to the depth information; and blurring is performed on the background area. Depth information at each pixel in the images is obtained according to the two images respectively focused on a foreground and a background, and a background area is determined according to the depth information, so that blurring processing is completed automatically, thereby solving a problem in the prior art that box selection of a background area is inaccurate and an operation process is complex because a user needs to open an image using software and manually selects the background area, and achieving an effect of improving a blurring effect, simplifying a user operation, and saving user's time.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
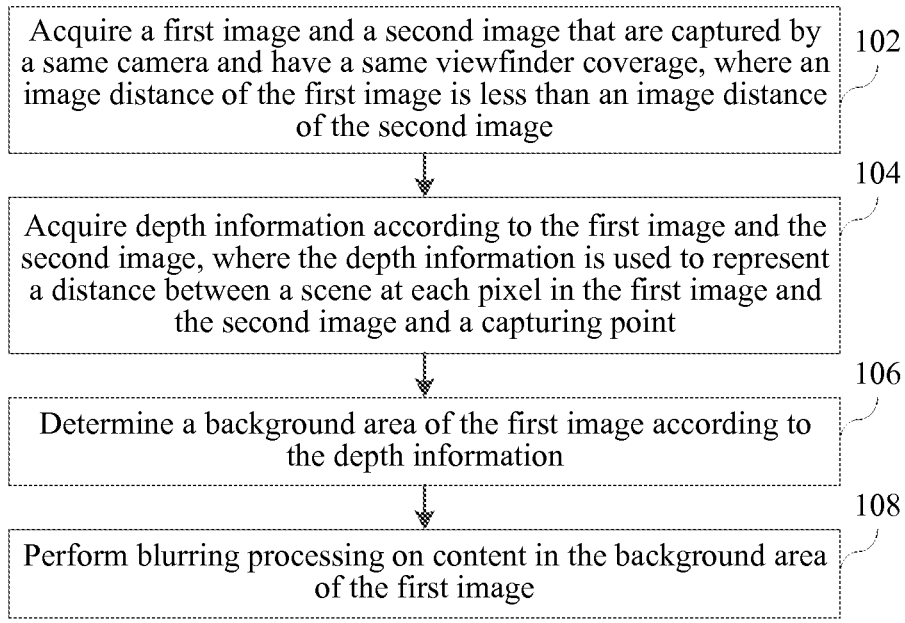
FIG. 1 is a method flowchart of an image blurring method according to an embodiment of the present invention.

FIG. 1 shows a method flowchart of an image blurring method according to an embodiment of the present invention. The image blurring method is used in an electronic device to perform background blurring on an image, where the electronic device may be a mobile phone, a digital camera, a tablet computer, or the like. The image blurring method may include the following steps.

Step 102: Acquire a first image and a second image that are captured by a same camera and have a same viewfinder coverage, where an image distance of the first image is less than an image distance of the second image.

Step 104: Acquire depth information according to the first image and the second image, where the depth information is used to represent a distance between a scene at each pixel in the first image and a capturing point and a distance between a scene at each pixel in the second image and the capturing point.

Step 106: Determine a background area of the first image according to the depth information.

Step 108: Perform blurring processing on content in the background area of the first image.

In conclusion, according to the image blurring method provided in this embodiment of the present invention, a first image and a second image that are captured by a same camera and have a same viewfinder coverage are acquired; depth information is acquired according to the first image and the second image; a background area of the first image is determined according to the depth information; and blurring is performed on the background area. Depth information at each pixel in the images is obtained according to the two images respectively focused on a foreground and a background, and a background area is determined according to the depth information, so that blurring processing is completed automatically, thereby solving a problem in the prior art that box selection of a background area is inaccurate and an operation process is complex because a user needs to open an image using software and manually selects the background area, and achieving an effect of improving a blurring effect, simplifying a user operation, and saving user's time.

Figure 2:
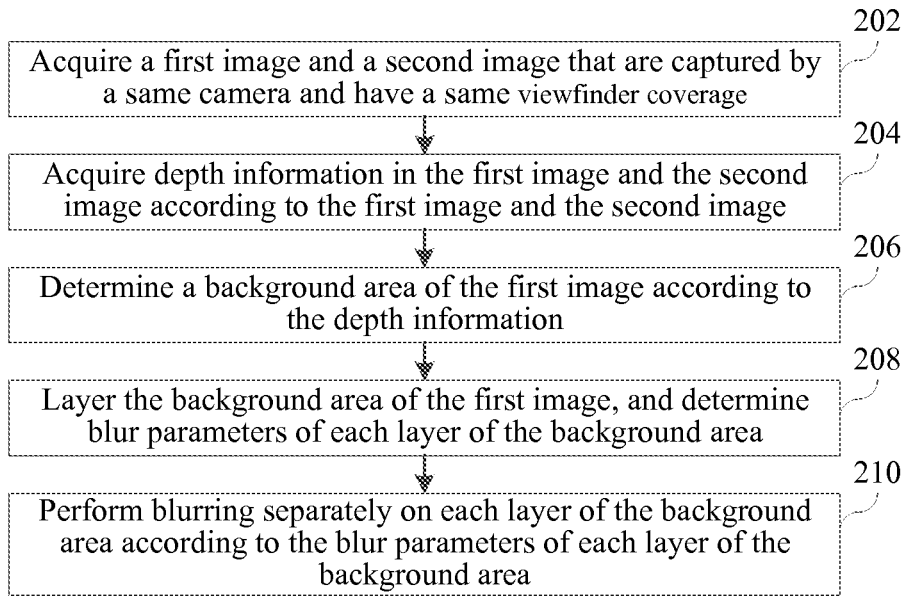
FIG. 2 is a method flowchart of an image blurring method according to another embodiment of the present invention.

FIG. 2 shows a method flowchart of an image blurring method according to another embodiment of the present invention. The image blurring method is used in an electronic device to perform background blurring on an image, where the electronic device may be a mobile phone, a digital camera, a tablet computer, or the like. In an example in which the electronic device is an electronic device including an image collecting unit, the image blurring method may include the following steps.

Step 202: Acquire a first image and a second image that are captured by a same camera and have a same viewfinder coverage.

An image distance of the first image is less than an image distance of the second image.

The electronic device may collect a group of multi-focus images using the image collecting unit (that is, a camera in the electronic device) included in the electronic device, acquire, from the group of multi-focus images, an image focused on a foreground (an image distance is relatively short) and another image focused on a background (an image distance is relatively long), and use the former image as the first image and the latter image as the second image.

Step 204: Acquire depth information of the first image and the second image according to the first image and the second image.

The depth information is used to represent a distance between a scene at each pixel in the first image and a capturing point and a distance between a scene at each pixel in the second image and the capturing point. Because the first image and the second image are taken from the same group of multi-focus images that are captured by the same camera, a distance between a scene at each pixel in the first image and a capturing point is consistent with a distance between a scene at each pixel in the second image and the capturing point, that is, the depth information obtained by computation is not only depth information of the first image but also depth information of the second image.

The electronic device may acquire photographic parameters of the camera in the electronic device, where the photographic parameters include a calibrated focal length, a lens diameter, and a relationship parameter, where the relationship parameter is used to represent a relationship between an aperture size of the camera and blurriness of a defocused image; the electronic device determines initialized depth information according to the photographic parameters and the respective image distances of the first image and the second image; the electronic device performs N iterative computations on the initialized depth information according to the photographic parameters, the first image, and the second image, where N is a positive integer and N≥2; and the electronic device acquires a result obtained by the $N^{th}$ iterative computation and uses the result as the depth information.

When performing a first computation, the electronic device determines a diffusion coefficient of the first computation and a diffusion area of the first computation according to the initialized depth information and the photographic parameters; according to the first image, the second image, the diffusion coefficient of the first computation, and the diffusion area of the first computation, determines forward heat diffusion equations that are respectively corresponding to the first image and the second image in the first computation; determines a minimum value equation in the first computation, where the minimum value equation is used to represent a minimum value of the sum of a first difference and a second difference, where the first difference is a difference between an actual output value and a theoretical output value of a forward heat diffusion equation corresponding to the first image, and the second difference is a difference between an actual output value and a theoretical output value of a forward heat diffusion equation corresponding to the second image; according to the minimum value equation in the first computation, obtains a minimum gradient of each pixel in the first image and the second image in the first computation; according to a preset correction formula, performs n iterative corrections on depth information corresponding to a pixel of which a minimum gradient in the first computation is less than a preset gradient threshold, and obtains depth information after the first computation, where n is a positive integer and n≥2; and when performing a $p^{th}$ computation, the electronic device determines a diffusion coefficient of the $p^{th}$ computation and a diffusion area of the $p^{th}$ computation according to depth information that is obtained after a $(p-1)^{th}$ computation and the photographic parameters; according to the first image, the second image, the diffusion coefficient of the $p^{th}$ computation, and the diffusion area of the $p^{th}$ computation, determines forward heat diffusion equations that are respectively corresponding to the first image and the second image in the $p^{th}$ computation; determines a minimum value equation in the $p^{th}$ computation; according to the minimum value equation in the $p^{th}$ computation, obtains a minimum gradient of each pixel in the first image and the second image in the $p^{th}$ computation; according to the preset correction formula, performs n iterative corrections on depth information corresponding to a pixel of which a minimum gradient in the $p^{th}$ computation is less than the preset gradient threshold, and obtains depth information after the $p^{th}$ computation, where $2 \le p \le N$.

The correction formula is: $s'(y)=s(y)-(data\_reg+2\alpha\kappa s(y)-2\alpha\Delta s(y))$; where $s'(y)$ is depth information after a correction, $s(y)$ is depth information before the correction, data_reg is a minimum gradient, and $\alpha$ and k are preset regularization parameters.

A scene image captured by a camera is merely an energy distribution of luminous intensity of a scene. This energy distribution is described using heat diffusion on a metal plate, where a temperature of a given point represents intensity, and then a multi-focus imaging process may be modeled using a theory of heat diffusion.

An imaging process of a multi-focus image is modeled using a theory of anisotropic heat diffusion, which converts extraction of depth information into an extreme value problem of an energy functional with a regularization term, and a depth of field, that is, the depth information of the first image and the second image, is obtained by iteration. Specific computation steps are as follows.

1) Acquire two multi-focus images $I_1$ and $I_2$ that are captured by the electronic device, and acquire calibrated camera parameters that are required, including a focal length f of the camera, image distances $v_1$ and $v_2$ of the two multi-focus images, a lens diameter D, and a relationship parameter $\gamma$. The electronic device may read the focal length f, target distances $d_1$ and $d_2$, and an aperture value F directly from image file headers. Then, the image distances $v_1$ and $v_2$ may be obtained using f and $d_1$ and $d_2$ according to a formula (2.1); and the lens diameter D=f/F. If the foregoing parameters cannot be acquired from the image file headers, the following default parameters may be used: f=12 mm, F=2.0, and $d_1$ and $d_2$ are 0.52 m and 0.85 m respectively.

$$v_1 = \frac{f \cdot d_1}{d_1 - f}, v_2 = \frac{f \cdot d_2}{d_2 - f}; \qquad (2.1)$$

2) Set a gradient threshold $\epsilon$, virtual time $\Delta t$, regularization parameters $\alpha$ and k, a correction step length $\beta$, and the number of iteration times N.

3) Obtain initialized depth information:

$$s_0(y) = \frac{(v_1 + v_2)f}{v_1 + v_2 - 2f},$$

and in this case, an initial depth value of each pixel in the images is this value, where y is two-dimensional coordinates of the image $I_1$ or $I_2$.

4) According to depth information $s(y)$, compute a corresponding diffusion coefficient $c(y)$ and diffusion areas $\Omega+$ and $\Omega-$ using the following formulas:

$$c(y) = \frac{\gamma^2 D^2}{8\Delta t}\left(v_2^2\left(\frac{1}{f} - \frac{1}{v_2} - \frac{1}{s(y)}\right)^2 - v_1^2\left(\frac{1}{f} - \frac{1}{v_1} - \frac{1}{s(y)}\right)^2\right); \qquad (2.2)$$

$$\begin{cases} \Omega_+ = \{y \in R^2 \mid c(y) > 0\} \\ \Omega_- = \{y \in R^2 \mid c(y) \le 0\} = \Omega - \Omega_+ \end{cases}; \qquad (2.3)$$

5) Simulate the following forward heat diffusion equations of the two images using the parameters obtained in the foregoing steps:

$$\begin{cases} \frac{\partial u(y,t)}{\partial t} = \nabla \cdot (c(y)\nabla u(y,t)), \ y \in \Omega_+, t \in (0,\infty) \\ u(y,0) = I_1(y), \ \forall \ (y) \in \Omega_+ \end{cases} \quad (2.4)$$

$$\begin{cases} \frac{\partial u(y,t)}{\partial t} = \nabla \cdot (c(y)\nabla u(y,t)), \ y \in \Omega_-, t \in (0,\infty) \\ u(y,0) = I_2(y), \ \forall \ (y) \in \Omega_- \end{cases} \quad (2.5)$$

in the equations, $I_1(y)$ is the input image $I_1$, $I_2(y)$ is the input image $I_2$, a diffusion coefficient $$c(y) = \frac{\sigma_2^2(y) - \sigma_1^2(y)}{2t},$$

$\nabla$ is a gradient operator $$\left[\frac{\partial u}{\partial y_1} \ \frac{\partial u}{\partial y_2}\right]^T,$$

and $\nabla'$ is a divergence operator $$\sum_{i=1}^{2} \frac{\partial}{\partial y_i}.$$

6) Solve the heat diffusion equations 2.4 and 2.5 in 5) separately to obtain their respective heat diffusion images $u_1(y, \Delta t)$ and $u_2(y, \Delta t)$ after the time $\Delta t$, and then use the heat diffusion images $u_1(y, \Delta t)$ $u_2 (y, \Delta t)$ and to simulate the following heat diffusion parabolic equations:

$$\begin{cases} \frac{\partial w_1(y,t)}{\partial t} = \nabla \cdot (c(y)\nabla w_1(y,t)) \ \ t \in (0,\infty) \\ w_1(y,0) = u_1(y,\Delta t) - I_2(y) \ \ \forall y \in \partial\Omega_+ \end{cases} \quad (2.6)$$

$$\begin{cases} \frac{\partial w_2(y,t)}{\partial t} = \nabla \cdot (-c(y)\nabla w_2(y,t)) \ \ t \in (0,\infty) \\ w_2(y,0) = u_2(y,\Delta t) - I_1(y) \ \ \forall y \in \partial\Omega_- \end{cases} \quad (2.7)$$

7) Solve the equations in 6) to obtain $w_1(y, \Delta t)$ and $w_2 (y, \Delta t)$, so as to obtain a minimum value of a formula (2.8):

$$\hat{s} = \underset{s}{\mathrm{argmin}}(E_1(s) + E_2(s));$$

(2.8) in the formula, $$E_1(s) = \int H(c(y))|u(y,\Delta t) - I_2(y)|^2 dy; \quad (2.9)$$

$$E_2(s) = \int H(-c(y))|u(y,\Delta t) - I_1(y)|^2 dy; \quad (2.10)$$

calculate a gradient for the formula (2.8):

$$\frac{\partial s}{\partial \tau} = -M(s)(E_1'(s) + E_2'(s)); \quad (2.11)$$

in the formula (2.11), $$E'_1(s) = (-2H(c(y))\int_0^{\Delta\tau} \nabla u(y,t) \cdot \nabla w_1(y,\Delta t-t)dt + \delta(c(y))(u_1(y,\Delta t) - I_2(y))^2) \cdot c'(s); \quad (2.12)$$

$$E'_2(s) = (2H(-c(y))\int_0^{\Delta\tau} \nabla u(y,t) \cdot \nabla w_2(y,\Delta t-t)dt + \delta(c(y))(u_2(y,\Delta t) - I_1(y))^2) \cdot c'(s); \quad (2.13)$$

in the foregoing formulas, $H(\cdot)$ represents a Heaviside function (a unit step function), and $\delta(\cdot)$ represents a Dirac function (a unit impulse function). $u_1(y, \Delta t)$ and $u_2 (y, \Delta t)$ are obtained by solving the equations in 5), $w_1(y, \Delta t)$ and $w_2(y, \Delta t)$ are obtained by solving the equations in 6), and c'(s) is a gradient value of a heat diffusion coefficient and may be obtained by computation according to the formula (2.2) as follows:

$$c'(s) = \frac{\gamma^2 D^2 (v_2 - v_1)}{4s^2 \Delta t}\left[(v_1 + v_1) \cdot \left(\frac{1}{F} - \frac{1}{s}\right) - 1\right]; \quad (2.14)$$

A computational formula of is as follows:

$$M(s) = \frac{1}{2[H(c(y)) \cdot I_2(y) \cdot u_1'(y,\Delta t) + H(-c(y)) \cdot I_1(y) \cdot u_2'(y,\Delta t)]}; \quad (2.15)$$

A minimum gradient of a result obtained by solving the formula (2.11) is denoted by data_reg, that is, $$\mathrm{data\_reg} = \frac{\partial s}{\partial \tau},$$

and then data_reg is compared with a preset gradient threshold: if data_reg≤ϵ, depth estimation of a pixel is relatively accurate, and no correction is required; and if data_reg>ϵ, depth estimation of a pixel is inaccurate, and it is required to perform a depth value correction.

8) Perform a correction on a depth value that needs to be corrected in 7) at the preset time step length β (that is, perform a depth correction for β times), and update a depth map. Assuming that: E'₃ (s)=−2αΔs(y)+2ακs(y); (2.16), Δs(y) represents a Laplace operator of s(y), that is, a quadratic sum of second derivatives. According to data_reg obtained by computation in 7), a corrected depth s'(y) in a unit step length may be obtained: s'(y)=s(y)−(data_reg+2ακs(y)−2αΔs(y)); (2.17) iteration is performed on a depth value s(y) for β times to obtain a final corrected depth value.

9) Use a corrected depth value obtained at each pixel as an initial depth value and return to 4), and continue execution until N times of iteration ends. A finally-obtained corrected depth value of each pixel is the depth information of the first image and the second image.

It should be noted that, to facilitate the foregoing computation of the depth information, the first image and the second image need to be transformed from an Red Green Blue(RGB) model to aHue Saturation Intensity (HSI) model in advance.

Step 206: Determine a background area of the first image according to the depth information.

The electronic device may determine a critical depth between a foreground area and a background area according to the photographic parameters and the respective image distances of the first image and the second image, and determine that a pixel area, in the first image, corresponding to the depth information that depth represent by the depth information that is greater than the critical depth is the background area of the first image.

Further, using a formula that represents a diffusion boundary: $\partial\Omega=\{y\in R^2|c(y)=0\}$; the electronic device may obtain a depth of a boundary between sharpness and blurriness:

$$s_0 = \frac{(v_1+v_2)f}{v_1+v_2-2f}.$$

Then, the foreground and the background may be divided directly according to the depth information, as shown in the following formula:

$$I(y) = \begin{cases} \text{Foreground} & S < S_0 \\ \text{Background} & S \geq S_0 \end{cases}.$$

Step 208: Layer the background area of the first image, and determine blur parameters of each layer of the background area.

Further, the electronic device may normalize the depth information to obtain normalized depth information; divide an interval, in the background area, of the normalized depth information equally into q segments to obtain q background intervals; and determine, according to a preset maximum blur radius, blur parameters corresponding to each of the q background intervals, where the blur parameters include a blur radius and a standard deviation.

For the background, a scale of Gaussian Blur on the background is determined.

First, an obtained depth map s is normalized to a range from 0 to 255 as follows:

$$u = \left\lfloor \frac{s}{s_{max}-s_{min}} \times 255 \right\rfloor;$$

according to the normalized depth information, in an example in which a value of q is 2, a blurring scale is divided into three segments. Assuming that: $u_0=\lfloor 255\times s_0 \rfloor$; a background area $[u_0, 255]$ is divided equally into two segments in the embodiment of the present invention, which is as follows:

$$i = \begin{cases} 1, & u \in [u_0, u_0+(255-u_0)/2] \\ 2, & u \in (u_0+(2550-u_0)/2, 255] \end{cases}.$$

A foreground area in the first image (the first image is focused on the foreground area by default) is kept unchanged, and the other two segments are background areas, and two incremental blurring scales are selected.

A method for selecting a scale in this embodiment is first determining a maximum blur radius j, where j may be determined according to a to-be-simulated aperture size of a camera. Generally, a larger aperture size yields a stronger background blurring effect, and a value of m is larger; and a smaller aperture size yields a milder background blurring effect, and a value of m is smaller.

Then, a blur radius $r_i$ of each segment is determined according to a decremental rule by selecting 2 as a cardinal number: $r_i=k-2(2-i)i\in[1,2]$; when a discrete approximation of a Gaussian function is computed in a practical application, according to distribution properties of the Gaussian function, comparatively, weighted values of pixels beyond a distance of approximately 3σ are extremely small, and therefore, computation of these pixels may be omitted. Then, it may be determined that a Gaussian standard deviation is:

$$\sigma = \frac{r}{3}.$$

Step 210: Perform blurring separately on each layer of the background area according to the blur parameters of each layer of the background area.

The electronic device may perform, according to the blur radius and the standard deviation that are corresponding to each of the q background intervals, blurring processing separately on a pixel area, in the first image, corresponding to each of the q background intervals.

After a radius and a standard deviation of a Gaussian function are obtained, blurring processing may be performed on an image using Gaussian filtering. Convolution processing is performed on a source image and the Gaussian function, and then a blurred image may be obtained:

$$g[x,y] \otimes f[x,y] = \sum_{k=0}^{m-1}\sum_{l=0}^{n-1} g[k,l] \cdot f[x-k, y-l];$$

where g[x, y] is the source image on which blurring processing needs to be performed, f[x, y] is a two-dimensional Gaussian function, and x and y are coordinates of the image; and m and n are a horizontal Gaussian Blur radius and a vertical Gaussian Blur radius respectively, and in this specification, a value $r_i$ is assigned to m and n.

The two-dimensional Gaussian function is defined as follows:

$$f(x,y) = Ae^{-\left(\frac{(x-x_0)^2}{2\sigma_x^2} + \frac{(y-y_0)^2}{2\sigma_y^2}\right)};$$

in the formula, $(x_0, y_0)$ is a central pixel of filtering; $\sigma_x$ and $\sigma_y$ are respectively a standard deviation in a horizontal direction and a standard deviation in a vertical direction of a Gaussian variance, and in this specification, a value σ is assigned to $\sigma_x$ and $\sigma_y$; and A is a normalized parameter, and $$A = \frac{1}{2\pi\sigma}.$$

In conclusion, according to the image blurring method provided in this embodiment of the present invention, a first image and a second image that are captured by a same camera and have a same viewfinder coverage are acquired; depth information is acquired according to the first image and the second image; a background area of the first image is determined according to the depth information; and blurring is performed on the background area. Depth information at each pixel in the images is obtained according to the two images respectively focused on a foreground and a background, and a background area is determined according to the depth information, so that blurring processing is completed automatically, thereby solving a problem in the prior art that box selection of a background area is inaccurate and an operation process is complex because a user needs to open an image using software and manually selects the background area, and achieving an effect of improving a blurring effect, simplifying a user operation, and saving user's time.

In addition, in the image blurring method provided in this embodiment of the present invention, the background area of the first image is layered according to the depth information, and blurring is performed on each layer of background area according to different blur parameters, which further improves the blurring effect.

Figure 3:
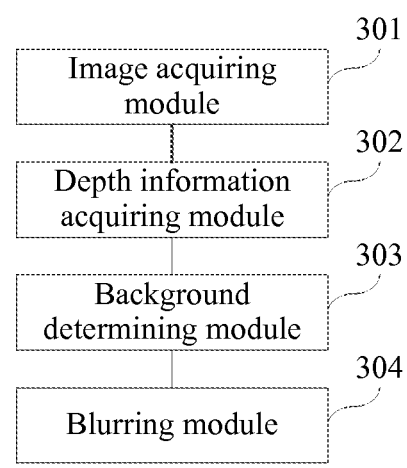
FIG. 3 is an apparatus structure diagram of an image blurring apparatus according to an embodiment of the present invention.

FIG. 3 shows an apparatus structure diagram of an image blurring apparatus according to an embodiment of the present invention. The image blurring apparatus is configured in an electronic device to perform background blurring on an image, where the electronic device may be a mobile phone, a digital camera, a tablet computer, or the like. The image blurring apparatus may include an image acquiring module 301 configured to acquire a first image and a second image that are captured by a same camera and have a same viewfinder coverage, where an image distance of the first image is less than an image distance of the second image; a depth information acquiring module 302 configured to acquire depth information according to the first image and the second image, where the depth information is used to represent a distance between a scene at each pixel in the first image and a capturing point and a distance between a scene at each pixel in the second image and the capturing point; a background determining module 303 configured to determine a background area of the first image according to the depth information; and a blurring module 304 configured to perform blurring processing on content in the background area of the first image.

In conclusion, according to the image blurring apparatus provided in this embodiment of the present invention, a first image and a second image that are captured by a same camera and have a same viewfinder coverage are acquired; depth information is acquired according to the first image and the second image; a background area of the first image is determined according to the depth information; and blurring is performed on the background area. Depth information at each pixel in the images is obtained according to the two images respectively focused on a foreground and a background, and a background area is determined according to the depth information, so that blurring processing is completed automatically, thereby solving a problem in the prior art that box selection of a background area is inaccurate and an operation process is complex because a user needs to open an image using software and manually selects the background area, and achieving an effect of improving a blurring effect, simplifying a user operation, and saving user's time.

Figure 4:
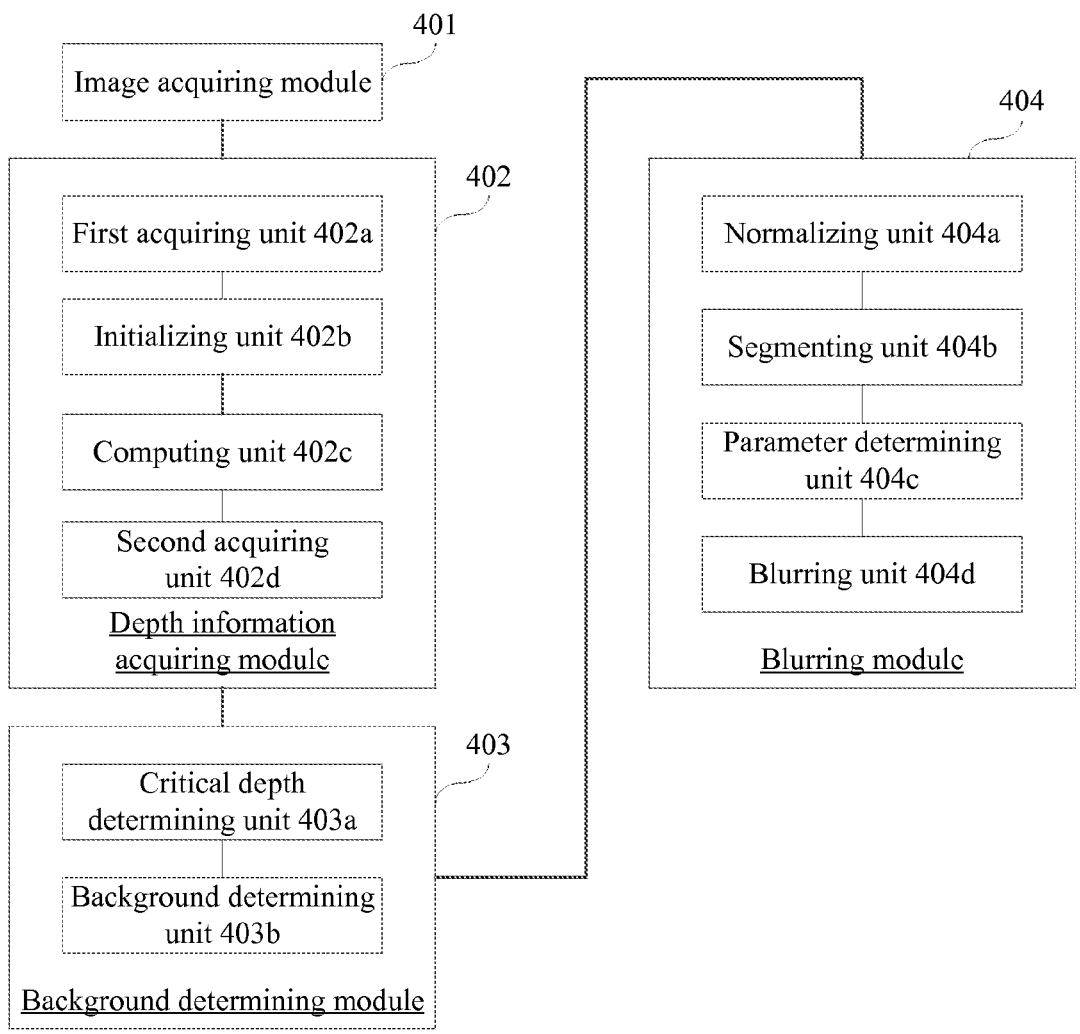
FIG. 4 is an apparatus structure diagram of an image blurring apparatus according to another embodiment of the present invention.

FIG. 4 shows an apparatus structure diagram of an image blurring apparatus according to an embodiment of the present invention. The image blurring apparatus is configured in an electronic device to perform background blurring on an image, where the electronic device may be a mobile phone, a digital camera, a tablet computer, or the like. The image blurring apparatus may include an image acquiring module 401 configured to acquire a first image and a second image that are captured by a same camera and have a same viewfinder coverage, where an image distance of the first image is less than an image distance of the second image; a depth information acquiring module 402 configured to acquire depth information according to the first image and the second image, where the depth information is used to represent a distance between a scene at each pixel in the first image and a capturing point and a distance between a scene at each pixel in the second image and the capturing point; a background determining module 403 configured to determine a background area of the first image according to the depth information; and a blurring module 404 configured to perform blurring processing on content in the background area of the first image.

The depth information acquiring module 402 includes a first acquiring unit 402a configured to acquire photographic parameters of the camera, where the photographic parameters include a calibrated focal length, a lens diameter, and a relationship parameter, where the relationship parameter is used to represent a relationship between an aperture size of the camera and blurriness of a defocused image; an initializing unit 402b configured to determine initialized depth information according to the photographic parameters and the respective image distances of the first image and the second image; a computing unit 402c configured to perform N iterative computations on the initialized depth information according to the photographic parameters, the first image, and the second image, where N is a positive integer and N≥2; and a second acquiring unit 402d configured to acquire a result obtained by the $N^{th}$ iterative computation and use the result as the depth information.

The computing unit 402c is configured to, when a first computation is performed, determine a diffusion coefficient of the first computation and a diffusion area of the first computation according to the initialized depth information and the photographic parameters; according to the first image, the second image, the diffusion coefficient of the first computation, and the diffusion area of the first computation, determine forward heat diffusion equations that are respectively corresponding to the first image and the second image in the first computation; determine a minimum value equation in the first computation, where the minimum value equation is used to represent a minimum value of the sum of a first difference and a second difference, where the first difference is a difference between an actual output value and a theoretical output value of a forward heat diffusion equation corresponding to the first image, and the second difference is a difference between an actual output value and a theoretical output value of a forward heat diffusion equation corresponding to the second image; according to the minimum value equation in the first computation, obtain a minimum gradient of each pixel in the first image and the second image in the first computation; according to a preset correction formula, perform n iterative corrections on depth information corresponding to a pixel of which a minimum gradient in the first computation is less than a preset gradient threshold, and obtain depth information after the first computation, where n is a positive integer and n≥2; and the computing unit 402c is configured to, when a $p^{th}$ computation is performed, determine a diffusion coefficient of the $p^{th}$ computation and a diffusion area of the $p^{th}$ computation according to depth information that is obtained after a $(p-1)^{th}$ computation and the photographic parameters; according to the first image, the second image, the diffusion coefficient of the $p^{th}$ computation, and the diffusion area of the $p^{th}$ computation, determine forward heat diffusion equations that are respectively corresponding to the first image and the second image in the $p^{th}$ computation; determine a minimum value equation in the $p^{th}$ computation; according to the minimum value equation in the $p^{th}$ computation, obtain a minimum gradient of each pixel in the first image and the second image in the $p^{th}$ computation; according to the preset correction formula, perform n iterative corrections on depth information corresponding to a pixel of which a minimum gradient in the $p^{th}$ computation is less than the preset gradient threshold, and obtain depth information after the $p^{th}$ computation, where $2 \leq p \leq N$.

The background determining module 403 includes a critical depth determining unit 403a configured to determine a critical depth between a foreground area and a background area according to the photographic parameters and the respective image distances of the first image and the second image; and a background determining unit 403b configured to determine that a pixel area, in the first image, corresponding to the depth information that depth represent by the depth information that is greater than the critical depth is the background area of the first image.

The blurring module 404 includes a normalizing unit 404a configured to normalize the depth information to obtain normalized depth information; a segmenting unit 404b configured to divide an interval, in the background area, of the normalized depth information equally into q segments to obtain q background intervals; a parameter determining unit 404c configured to determine, according to a preset maximum blur radius, blur parameters corresponding to each of the q background intervals, where the blur parameters include a blur radius and a standard deviation; and a blurring unit 404d configured to perform, according to the blur radius and the standard deviation that are corresponding to each of the q background intervals, blurring processing separately on a pixel area, in the first image, corresponding to each of the q background intervals.

In conclusion, according to the image blurring apparatus provided in this embodiment of the present invention, a first image and a second image that are captured by a same camera and have a same viewfinder coverage are acquired; depth information is acquired according to the first image and the second image; a background area of the first image is determined according to the depth information; and blurring is performed on the background area. Depth information at each pixel in the images is obtained according to the two images respectively focused on a foreground and a background, and a background area is determined according to the depth information, so that blurring processing is completed automatically, thereby solving a problem in the prior art that box selection of a background area is inaccurate and an operation process is complex because a user needs to open an image using software and manually selects the background area, and achieving an effect of improving a blurring effect, simplifying a user operation, and saving user's time.

In addition, in the image blurring apparatus provided in this embodiment of the present invention, the background area of the first image is layered according to the depth information, and blurring is performed on each layer of background area according to different blur parameters, which further improves the blurring effect.

Figure 5:
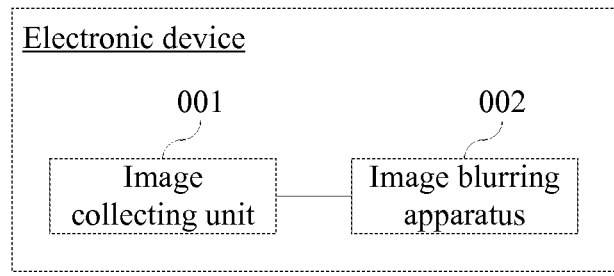
FIG. 5 is a device composition diagram of an electronic device according to an embodiment of the present invention.

FIG. 5 shows a device composition diagram of an electronic device according to an embodiment of the present invention. The electronic device may be a mobile phone, a digital camera, a tablet computer, or the like. The electronic device may include an image collecting unit 001 and an image blurring apparatus 002 shown in the foregoing FIG. 3 or FIG. 4.

In conclusion, according to the electronic device provided in this embodiment of the present invention, a first image and a second image that are captured by a same camera and have a same viewfinder coverage are acquired; depth information is acquired according to the first image and the second image; a background area of the first image is determined according to the depth information; and blurring is performed on the background area. Depth information at each pixel in the images is obtained according to the two images respectively focused on a foreground and a background, and a background area is determined according to the depth information, so that blurring processing is completed automatically, thereby solving a problem in the prior art that box selection of a background area is inaccurate and an operation process is complex because a user needs to open an image using software and manually selects the background area, and achieving an effect of improving a blurring effect, simplifying a user operation, and saving user's time.

In addition, in the electronic device provided in this embodiment of the present invention, the background area of the first image is layered according to the depth information, and blurring is performed on each layer of background area according to different blur parameters, which further improves the blurring effect.

Figure 6:
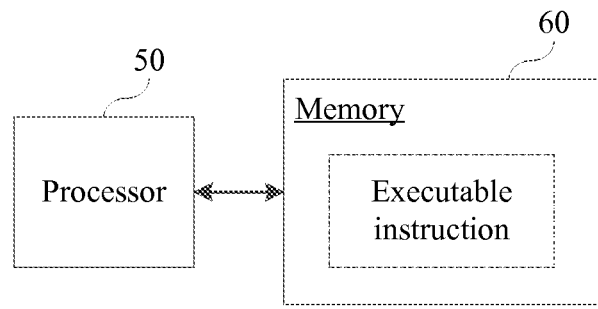
FIG. 6 is a device composition diagram of an electronic device according to another embodiment of the present invention.

FIG. 6 shows a device composition diagram of an electronic device according to another embodiment of the present invention. The electronic device may be a mobile phone, a digital camera, a tablet computer, or the like. The electronic device may include a processor 50; and a memory 60 that is configured to store an instruction executable by the processor 50.

The processor 50 is configured to acquire a first image and a second image that are captured by a same camera and have a same viewfinder coverage, where an image distance of the first image is less than an image distance of the second image; the processor 50 is configured to acquire depth information according to the first image and the second image, where the depth information is used to represent a distance between a scene at each pixel in the first image and a capturing point and a distance between a scene at each pixel in the second image and the capturing point; the processor 50 is configured to determine a background area of the first image according to the depth information; and the processor 50 is configured to perform blurring processing on content in the background area of the first image.

In conclusion, according to the electronic device provided in this embodiment of the present invention, a first image and a second image that are captured by a same camera and have a same viewfinder coverage are acquired; depth information is acquired according to the first image and the second image; a background area of the first image is determined according to the depth information; and blurring is performed on the background area. Depth information at each pixel in the images is obtained according to the two images respectively focused on a foreground and a background, and a background area is determined according to the depth information, so that blurring processing is completed automatically, thereby solving a problem in the prior art that box selection of a background area is inaccurate and an operation process is complex because a user needs to open an image using software and manually selects the background area, and achieving an effect of improving a blurring effect, simplifying a user operation, and saving user's time.

Figure 7:
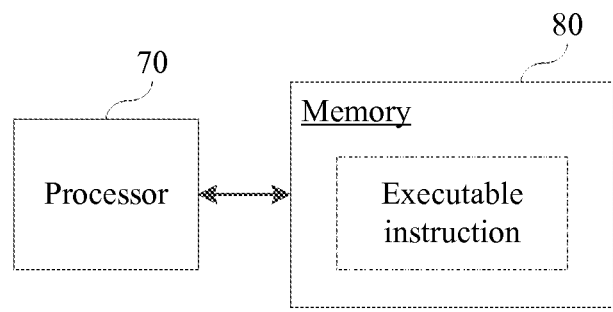
FIG. 7 is a device composition diagram of an electronic device according to still another embodiment of the present invention.

FIG. 7 shows a device composition diagram of an electronic device according to still another embodiment of the present invention. The electronic device may be a mobile phone, a digital camera, a tablet computer, or the like. The electronic device may include a processor 70; and a memory 80 that is configured to store an instruction executable by the processor 70.

The processor 70 is configured to acquire a first image and a second image that are captured by a same camera and have a same viewfinder coverage, where an image distance of the first image is less than an image distance of the second image; the processor 70 is configured to acquire depth information according to the first image and the second image, where the depth information is used to represent a distance between a scene at each pixel in the first image and a capturing point and a distance between a scene at each pixel in the second image and the capturing point; the processor 70 is configured to determine a background area of the first image according to the depth information; and the processor 70 is configured to perform blurring processing on content in the background area of the first image.

The processor 70 is configured to acquire photographic parameters of the camera, where the photographic parameters include a calibrated focal length, a lens diameter, and a relationship parameter, where the relationship parameter is used to represent a relationship between an aperture size of the camera and blurriness of a defocused image; the processor 70 is configured to determine initialized depth information according to the photographic parameters and the respective image distances of the first image and the second image; the processor 70 is configured to perform N iterative computations on the initialized depth information according to the photographic parameters, the first image, and the second image, where N is a positive integer and N≥2; and the processor 70 is configured to acquire a result obtained by the $N^{th}$ iterative computation and use the result as the depth information.

The processor 70 is configured to, when a first computation is performed, determine a diffusion coefficient of the first computation and a diffusion area of the first computation according to the initialized depth information and the photographic parameters; according to the first image, the second image, the diffusion coefficient of the first computation, and the diffusion area of the first computation, determine forward heat diffusion equations that are respectively corresponding to the first image and the second image in the first computation; determine a minimum value equation in the first computation, where the minimum value equation is used to represent a minimum value of the sum of a first difference and a second difference, where the first difference is a difference between an actual output value and a theoretical output value of a forward heat diffusion equation corresponding to the first image, and the second difference is a difference between an actual output value and a theoretical output value of a forward heat diffusion equation corresponding to the second image; according to the minimum value equation in the first computation, obtain a minimum gradient of each pixel in the first image and the second image in the first computation; according to a preset correction formula, perform n iterative corrections on depth information corresponding to a pixel of which a minimum gradient in the first computation is less than a preset gradient threshold, and obtain depth information after the first computation, where n is a positive integer and n≥2; and the processor 70 is configured to, when a $p^{th}$ computation is performed, determine a diffusion coefficient of the $p^{th}$ computation and a diffusion area of the $p^{th}$ computation according to depth information that is obtained after a $(p-1)^{th}$ computation and the photographic parameters; according to the first image, the second image, the diffusion coefficient of the $p^{th}$ computation, and the diffusion area of the $p^{th}$ computation, determine forward heat diffusion equations that are respectively corresponding to the first image and the second image in the $p^{th}$ computation; determine a minimum value equation in the $p^{th}$ computation; according to the minimum value equation in the $p^{th}$ computation, obtain a minimum gradient of each pixel in the first image and the second image in the $p^{th}$ computation; according to the preset correction formula, perform n iterative corrections on depth information corresponding to a pixel of which a minimum gradient in the $p^{th}$ computation is less than the preset gradient threshold, and obtain depth information after the $p^{th}$ computation, where 2≤p≤N.

The processor 70 is configured to determine a critical depth between a foreground area and a background area according to the photographic parameters and the respective image distances of the first image and the second image; and the processor 70 is configured to determine that a pixel area, in the first image, corresponding to the depth information that depth represent by the depth information that is greater than the critical depth is the background area of the first image.

The processor 70 is configured to normalize the depth information to obtain normalized depth information; the processor 70 is configured to divide an interval, in the background area, of the normalized depth information equally into q segments to obtain q background intervals; the processor 70 is configured to determine, according to a preset maximum blur radius, blur parameters corresponding to each of the q background intervals, where the blur parameters include a blur radius and a standard deviation; and the processor 70 is configured to perform, according to the blur radius and the standard deviation that are corresponding to each of the q background intervals, blurring processing separately on a pixel area, in the first image, corresponding to each of the q background intervals.

In conclusion, according to the electronic device provided in this embodiment of the present invention, a first image and a second image that are captured by a same camera and have a same viewfinder coverage are acquired; depth information is acquired according to the first image and the second image; a background area of the first image is determined according to the depth information; and blurring is performed on the background area. Depth information at each pixel in the images is obtained according to the two images respectively focused on a foreground and a background, and a background area is determined according to the depth information, so that blurring processing is completed automatically, thereby solving a problem in the prior art that box selection of a background area is inaccurate and an operation process is complex because a user needs to open an image using software and manually selects the background area, and achieving an effect of improving a blurring effect, simplifying a user operation, and saving user's time.

In addition, in the electronic device provided in this embodiment of the present invention, the background area of the first image is layered according to the depth information, and blurring is performed on each layer of background area according to different blur parameters, which further improves the blurring effect.

It should be noted that the division of the foregoing functional modules is merely used as an example for description when the image blurring apparatus provided in the foregoing embodiments performs background blurring. In a practical application, the foregoing functions may be allocated to different functional modules for completion according to a requirement, that is, an internal structure of the apparatus may be divided into different functional modules so as to complete all or part of the functions described above. In addition, the image blurring apparatus provided in the foregoing embodiments pertains to a same concept as the embodiments of the image blurring method, and reference may be made to the method embodiments for a specific implementation process of the image blurring apparatus, which is not described herein again.

The foregoing serial numbers in the embodiments of the present invention are merely for description, but do not represent merits or demerits of the embodiments.

A person of ordinary skill in the art may understand that all or a part of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present invention, but are not intended to limit the present invention. Any modification, equivalent replacement, and improvement made without departing from the principle of the present invention shall fall within the protection scope of the present invention.

The invention claimed is:

1. An image blurring method comprising:
acquiring a first image and a second image that are captured by a same camera and have a same viewfinder coverage, wherein an image distance of the first image is less than an image distance of the second image;
acquiring depth information according to the first image and the second image, wherein the depth information is used to represent a distance between a scene at each pixel in the first image and a capturing point, wherein the depth information is used to represent a distance between a scene at each pixel in the second image and the capturing point, and wherein acquiring the depth information according to the first image and the second image comprises:
  acquiring photographic parameters of the camera, wherein the photographic parameters comprise a calibrated focal length, a lens diameter, and a relationship parameter, and wherein the relationship parameter is used to represent a relationship between an aperture size of the camera and blurriness of a defocused image;
  determining initialized depth information according to the photographic parameters and the respective image distances of the first image and the second image;
  performing N iterative computations on the initialized depth information according to the photographic parameters, the first image, and the second image, wherein N is a positive integer and N is greater than or equal to 2; and
  acquiring a result obtained by the $N^{th}$ iterative computation and using the result as the depth information;
determining a background area of the first image according to the depth information; and
performing blurring processing on content in the background area of the first image, wherein performing N iterative computations on the initialized depth information according to the photographic parameters, the first image, and the second image comprises:
  determining a diffusion coefficient of a first computation and a diffusion area of the first computation according to the initialized depth information and the photographic parameters when the first computation is performed;
  determining, according to the first image, the second image, the diffusion coefficient of the first computation, and the diffusion area of the first computation, forward heat diffusion equations that are respectively corresponding to the first image and the second image in the first computation;
  determining a minimum value equation in the first computation, wherein the minimum value equation is used to represent a minimum value of the sum of a first difference and a second difference, wherein the first difference is a difference between an actual output value and a theoretical output value of a forward heat diffusion equation corresponding to the first image, and wherein the second difference is a difference between an actual output value and a theoretical output value of a forward heat diffusion equation corresponding to the second image;
  obtaining, according to the minimum value equation in the first computation, a minimum gradient of each pixel in the first image and the second image in the first computation;
  performing, according to a preset correction formula, n iterative corrections on depth information corresponding to a pixel of which a minimum gradient in the first computation is less than a preset gradient threshold; and
  obtaining depth information after the first computation, wherein n is a positive integer and n is greater than or equal to 2.

2. The method according to claim 1, wherein the correction formula is $s'(y)=s(y)-(data\_reg+2\alpha\kappa s(y)-2\alpha\Delta s(y))$, wherein $s'(y)$ is depth information after a correction, wherein $s(y)$ is depth information before the correction, wherein data_reg is a minimum gradient, and wherein $\alpha$ and k are preset regularization parameters.

3. The method according to claim 1, wherein determining the background area of the first image according to the depth information comprises:
determining a critical depth between a foreground area and a background area according to photographic parameters and the respective image distances of the first image and the second image; and
determining that a pixel area, in the first image, corresponding to the depth information that depth represent by the depth information that is greater than the critical depth is the background area of the first image.

4. The method according to claim 1, wherein performing blurring processing on the content in the background area of the first image comprises:
normalizing the depth information to obtain normalized depth information;
dividing an interval, in the background area, of the normalized depth information equally into q segments to obtain q background intervals;
determining, according to a preset maximum blur radius, blur parameters corresponding to each of the q background intervals, wherein the blur parameters comprise a blur radius and a standard deviation; and
performing, according to the blur radius and the standard deviation that are corresponding to each of the q background intervals, blurring processing separately on a pixel area, in the first image, corresponding to each of the q background intervals.

5. An image blurring apparatus comprising:
a memory configured to store computer executable instructions;
a processor coupled to the memory, wherein the processor is configured to execute the computer executable instructions and cause the image blurring apparatus to:
  acquire a first image and a second image that are captured by a same camera and have a same viewfinder coverage, wherein an image distance of the first image is less than an image distance of the second image;
  acquire depth information according to the first image and the second image, wherein the depth information is used to represent a distance between a scene at each pixel in the first image and a capturing point, wherein the depth information is used to represent a distance between a scene at each pixel in the second image and the capturing point, and wherein acquiring the depth information according to the first image and the second image comprises:

acquiring photographic parameters of the camera, wherein the photographic parameters comprise a calibrated focal length, a lens diameter, and a relationship parameter, and wherein the relationship parameter is used to represent a relationship between an aperture size of the camera and blurriness of a defocused image;

determining initialized depth information according to the photographic parameters and the respective image distances of the first image and the second image;

performing N iterative computations on the initialized depth information according to the photographic parameters, the first image, and the second image, wherein N is a positive integer and N is greater than or equal to 2; and acquiring a result obtained by the $N^{th}$ iterative computation and use the result as the depth information;

determining a background area of the first image according to the depth information; and performing blurring processing on content in the background area of the first image;

determine a diffusion coefficient of a first computation and a diffusion area of the first computation according to the initialized depth information and the photographic parameters when the first computation is performed;

determine, according to the first image, the second image, the diffusion coefficient of the first computation, and the diffusion area of the first computation, forward heat diffusion equations that are respectively corresponding to the first image and the second image in the first computation;

determine a minimum value equation in the first computation, wherein the minimum value equation is used to represent a minimum value of the sum of a first difference and a second difference, wherein the first difference is a difference between an actual output value and a theoretical output value of a forward heat diffusion equation corresponding to the first image, and wherein the second difference is a difference between an actual output value and a theoretical output value of a forward heat diffusion equation corresponding to the second image;

obtain, according to the minimum value equation in the first computation, a minimum gradient of each pixel in the first image and the second image in the first computation;

perform, according to a preset correction formula, n iterative corrections on depth information corresponding to a pixel of which a minimum gradient in the first computation is less than a preset gradient threshold; and obtain depth information after the first computation, wherein n is a positive integer and n≥2.

6. The apparatus according to claim 5, wherein the instructions are further configured to cause the image blurring apparatus to:

determine a critical depth between a foreground area and a background area according to photographic parameters and the respective image distances of the first image and the second image; and determine that a pixel area, in the first image, corresponding to the depth information that depth represent by the depth information that is greater than the critical depth is the background area of the first image.

7. The apparatus according to claim 5, wherein the instructions are further configured to cause the image blurring apparatus to:

normalize the depth information to obtain normalized depth information;

divide an interval, in the background area, of the normalized depth information equally into q segments to obtain q background intervals;

determine, according to a preset maximum blur radius, blur parameters corresponding to each of the q background intervals, wherein the blur parameters comprise a blur radius and a standard deviation; and perform, according to the blur radius and the standard deviation that are corresponding to each of the q background intervals, blurring processing separately on a pixel area, in the first image, corresponding to each of the q background intervals.

8. An image blurring method, comprising:

acquiring a first image and a second image that are captured by a same camera and have a same viewfinder coverage, wherein an image distance of the first image is less than an image distance of the second image;

acquiring depth information according to the first image and the second image, wherein the depth information is used to represent a distance between a scene at each pixel in the first image and a capturing point, wherein the depth information is used to represent a distance between a scene at each pixel in the second image and the capturing point, and wherein acquiring the depth information according to the first image and the second image comprises:

acquiring photographic parameters of the camera, wherein the photographic parameters comprise a calibrated focal length, a lens diameter, and a relationship parameter, and wherein the relationship parameter is used to represent a relationship between an aperture size of the camera and blurriness of a defocused image;

determining initialized depth information according to the photographic parameters and the respective image distances of the first image and the second image;

performing N iterative computations on the initialized depth information according to the photographic parameters, the first image, and the second image, wherein N is a positive integer and N is greater than or equal to 2; and acquiring a result obtained by the $N^{th}$ iterative computation and using the result as the depth information; and determining a background area of the first image according to the depth information; and performing blurring processing on content in the background area of the first image, wherein performing N iterative computations on the initialized depth information according to the photographic parameters, the first image, and the second image comprises:

determining a diffusion coefficient of a $p^{th}$ computation and a diffusion area of the $p^{th}$ computation according to depth information that is obtained after a $(p-1)^{th}$ computation and the photographic parameters when the $p^{th}$ computation is performed;

determining, according to the first image, the second image, the diffusion coefficient of the $p^{th}$ computation, and the diffusion area of the $p^{th}$ computation, forward heat diffusion equations that are respectively corresponding to the first image and the second image in the $p^{th}$ computation;

determining a minimum value equation in the $p^{th}$ computation;

obtaining, according to the minimum value equation in the $p^{th}$ computation, a minimum gradient of each pixel in the first image and the second image in the $p^{th}$ computation;

performing, according to a preset correction formula, n iterative corrections on depth information corresponding to a pixel of which the minimum gradient in the $p^{th}$ computation is less than a preset gradient threshold; and obtaining depth information after the $p^{th}$ computation, wherein p is greater than or equal to 2 and less than or equal to N.

9. The method according to claim 8, wherein the correction formula is $s'(y)=s(y)-(data\_reg+2\alpha\kappa s(y)-2\alpha\Delta s(y))$, wherein $s'(y)$ is depth information after a correction, wherein $s(y)$ is depth information before the correction, wherein data_reg is a minimum gradient, and wherein $\alpha$ and k are preset regularization parameters.

* * * * *